E. L., H. T. AND S. J. STANTON.
RAIN AND SUN SHIELD FOR AUTOMOBILES.
APPLICATION FILED APR. 21, 1920.
1,384,574.
Patented July 12, 1921.
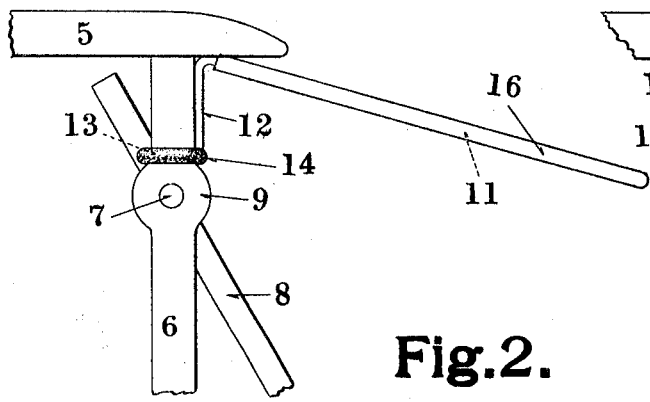
Fig.1.
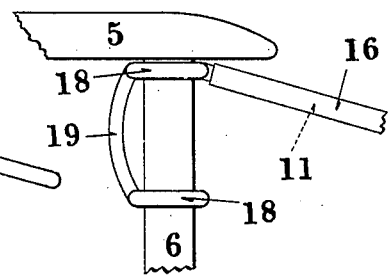
Fig.4.
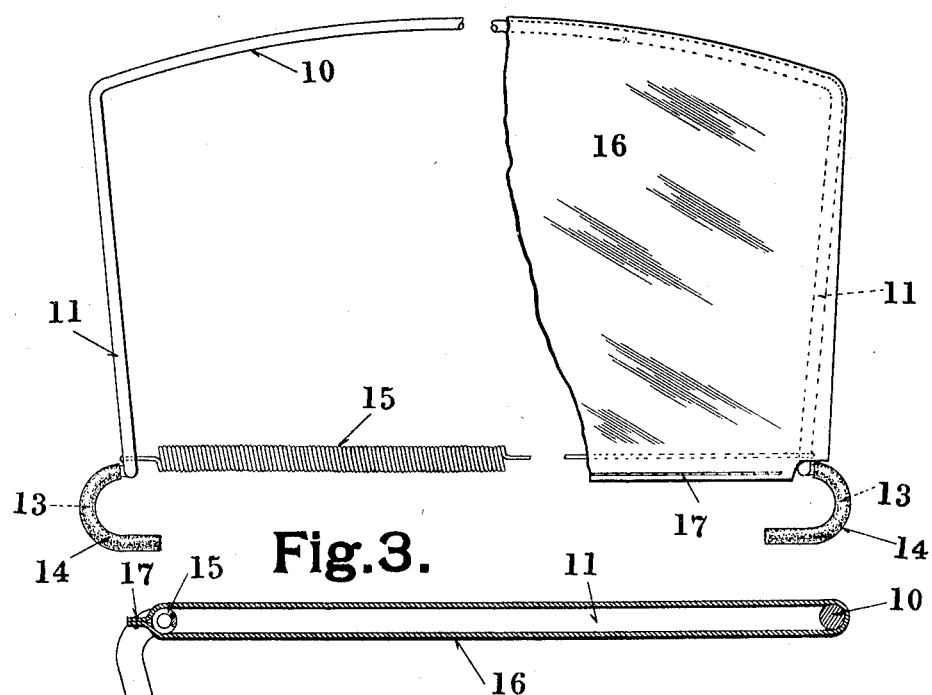
Fig.2.
Fig.3.
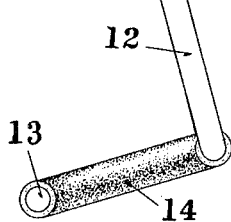
INVENTORS
E. L. STANTON
H. T. STANTON
S. J. STANTON
BY
ATTORNEY

UNITED STATES PATENT OFFICE.

EDWARD L. STANTON, HARRY T. STANTON, AND STODDARD J. STANTON, OF ST. LOUIS, MISSOURI.

RAIN AND SUN SHIELD FOR AUTOMOBILES.

1,384,574.  Specification of Letters Patent.  Patented July 12, 1921.

Application filed April 21, 1920. Serial No. 375,437.

*To all whom it may concern:*

Be it known that we, EDWARD L. STANTON, HARRY T. STANTON, and STODDARD J. STANTON, citizens of the United States of America, residing at the city of St. Louis, State of Missouri, United States of America, have invented a certain new and useful Rain and Sun Shield for Automobiles, of which the following is such a full, clear, and exact description as will enable any one skilled in the art to which it appertains to make and use the same, reference being had to the accompanying drawings, forming part of this specification.

Our invention relates to a rain and sun shield for automobiles and more particularly to one which may be readily attached to and detached from the vehicle.

The object of our invention is to provide a device of the class described which would be simple in construction and which will fit varying widths of machines without alteration or adjustment.

In the accompanying drawings which illustrate a device made in accordance with our invention together with a portion of an automobile to which the same is applied, Figure 1 is a side elevation, Fig. 2 is a top plan view of the detached shield, part of the cover being broken away. Fig. 3 is a vertical cross section, and Fig. 4 is a view similar to Fig. 1 but showing a slight modification.

5 indicates the top of an automobile and 6 the front uprights in which is journaled the trunnions 7 carrying the usual wind shield 8. The uprights 6 usually have an enlarged portion 9 surrounding the trunnions 7 as shown in Fig. 1 of the drawings.

Our shield consists of a resilient frame, a covering therefor and clamping means for engaging with upright 6. The frame of our device is made of resilient wire or rod and consists of a front member 10 and two side members 11, the front member 10 being bowed or curved outwardly as shown in Fig. 2 of the drawings.

12 are uprights forming continuations of the side members 11 and terminating in hooks 13 forming clamping members for engaging with the uprights 6 of the automobile. The angle between the side members 11 and the uprights 12 is such as to cause the frame of the shield to project slightly downwardly as best shown in Fig. 1 of the drawings. In order to cause the clamping members 13 to adhere firmly to the upright 6 we provide them with a gripping covering preferably formed of a piece of rubber tubing 14 slipped over the wire of the loop. 15 is a spring member which extends from one of the side members 11 to the other adjacent to their junction with the uprights 12 and serves to hold the hooks 13 in clamping engagement with the uprights 6. 16 is a cover which may be made of leather, oil cloth or any other suitable material and surrounds the frame and also incloses the spring member 15 and is secured in position on the frame by any suitable fastening means such for instance as the row of stitching 17.

The bowed form of the front member 10 of the frame allows the clamping members 13 to assume positions against the tension of the spring 15 to adapt the shield to machines of varying width and we find in practice that this amount of accommodation is sufficient to adapt the device to all widths of machines which are now in practical use. It will be evident that our shield can be readily applied to and detached from an automobile without the use of screws, clamps, or other suitable device.

In Fig. 4 we have shown a slight modification in which the single loop 13 heretofore described is replaced by a pair of loops 18 one arranged above the other and connected together by an integral portion 19. In this form of device the upright portions 12 may be dispensed with and owing to the superior clamping qualities of the pair of loops the covering 14 may also be omitted. While this form of device is particularly applicable to machines provided with uprights without the enlarged portion 9 we prefer to curve the connecting portion 19 so that it will not come in contact with such enlarged portion in case the device is applied to a machine having such enlarged portions.

We claim—

1. In a device of the class described, the combination with a supporting spring frame, of a flexible cover surrounding said frame, and a pair of clamping loops carried by said frame and adapted by reason of the resiliency of said frame to be engaged with the uprights of a vehicle to removably secure the device in position.

2. In a device of the class described, the combination with a supporting spring frame, of a flexible cover surrounding said frame, and a pair of arms extending downwardly from said frame and terminating in clamping loops adapted by reason of the resiliency of said frame to be engaged with the uprights of a vehicle to removably secure the device in position.

3. In a device of the class described, the combination with a supporting spring frame, of a flexible cover surrounding said frame, a pair of clamping loops carried by said frame and adapted by reason of the resiliency of said frame to be engaged with the uprights of a vehicle to removably secure the device in position, and resilient covering for said clamping loops.

4. In a device of the class described, the combination with a supporting frame comprising a curved resilient front member and two end members, of clamping loops carried by inner ends of said end members, and a spring member extending between said end members for bending said resilient front member to force said clamping loops against uprights of a vehicle and thereby removably secure the device in position.

5. In a device of the class described, the combination with a supporting frame comprising a resilient front member and two end members, of clamping loops carried by the inner ends of said end members, a spring member extending between said end members for bending said resilient front member to hold said clamping loops against uprights of a vehicle and thereby removably secure the device in position, and a flexible cover for said frame.

6. In a device of the class described, the combination with a supporting frame comprising a resilient front member and two end members, of clamping loops carried by the inner ends of said end members, a spring member extending between said end members for bending said resilient front member to hold said clamping loops against the uprights of a vehicle and thereby removably secure the device in position, and a flexible cover surrounding said side and end members and also inclosing said spring member.

7. In a device of the class described, the combination with a spring supporting frame comprising a resilient front member and two end members, of clamping loops carried by the inner ends of said end members, a coil spring extending between said end members and attached thereto adjacent to the points of junction of said end members with the clamping loops, whereby said loops are held against the uprights of a vehicle to removably secure the device in position, and a flexible cover for said frame.

In testimony whereof, we have hereunto set our hands and affixed our seals.

EDWARD L. STANTON.
HARRY T. STANTON. [L. S.]
STODDARD J. STANTON. [L. S.]